United States Patent
Jang et al.

(10) Patent No.: US 10,819,822 B2
(45) Date of Patent: Oct. 27, 2020

(54) METHOD FOR RECORDING METADATA FOR WEB CACHING IN CLOUD ENVIRONMENT AND WEB SERVER USING THE SAME

(71) Applicant: TMAXSOFT. CO., LTD., Gyeonggi-do (KR)

(72) Inventors: Young Hwi Jang, Seoul (KR); Hee Jin Lee, Seoul (KR)

(73) Assignee: TMAXSOFT. CO., LTD., Gyeonggi-do (KR)

( * ) Notice: Subject to any disclaimer, the term of this patent is extended or adjusted under 35 U.S.C. 154(b) by 247 days.

(21) Appl. No.: 16/006,931

(22) Filed: Jun. 13, 2018

(65) Prior Publication Data

US 2019/0364128 A1 Nov. 28, 2019

(30) Foreign Application Priority Data

May 24, 2018 (KR) ........................ 10-2018-0059187

(51) Int. Cl.
*H04L 29/08* (2006.01)
*G06F 9/50* (2006.01)
*G06F 16/172* (2019.01)
*G06F 16/176* (2019.01)

(52) U.S. Cl.
CPC ........ *H04L 67/2842* (2013.01); *G06F 9/5077* (2013.01); *G06F 16/172* (2019.01); *G06F 16/176* (2019.01); *H04L 67/16* (2013.01)

(58) Field of Classification Search
CPC ... H04L 67/2842; H04L 67/16; G06F 16/176; G06F 16/172; G06F 9/5077
See application file for complete search history.

(56) References Cited

U.S. PATENT DOCUMENTS

| | | | |
|---|---|---|---|
| 8,447,851 B1* | 5/2013 | Anderson | G06F 11/3006 709/223 |
| 9,489,119 B1* | 11/2016 | Smith, Jr. | G06F 16/2428 |
| 10,585,594 B1* | 3/2020 | Armangau | G06F 3/0638 |
| 2012/0203742 A1* | 8/2012 | Goodman | G06F 16/122 707/646 |
| 2014/0325115 A1* | 10/2014 | Ramsundar | G06F 12/0238 711/102 |
| 2018/0084075 A1* | 3/2018 | Ron | G06F 9/547 |
| 2018/0276021 A1* | 9/2018 | Ueda | G06F 9/45558 |
| 2019/0370042 A1* | 12/2019 | Gupta | G06F 16/182 |
| 2020/0012510 A1* | 1/2020 | Andrianov | G06F 9/45558 |

* cited by examiner

*Primary Examiner* — Todd L Barker
(74) *Attorney, Agent, or Firm* — Husch Blackwell LLP

(57) ABSTRACT

A method for recording metadata for web caching in a cloud environment is provided. The method includes steps of: (a) a first web server caching file information of a first web server container corresponding to itself in a first cache memory in the first web server container; (b) the first web server recording metadata of the first cache memory in a common file storage; and (c) the first web server, if the first web server is scaled out by adding a second web server, allowing the second web server to access the common file storage, to thereby allow the metadata to be recorded in a second cache memory in a second web server container corresponding to the second web server.

12 Claims, 2 Drawing Sheets

METHOD FOR RECORDING METADATA FOR WEB CACHING IN CLOUD ENVIRONMENT AND WEB SERVER USING THE SAME

CROSS REFERENCE TO RELATED APPLICATION

This application claims priority to and incorporates herein by reference all disclosure in Korean patent application no. 10-2018-0059187 filed May 24, 2018.

FIELD OF THE INVENTION

The present invention relates to a method for recording metadata for web caching in a cloud environment, and more particularly, to the method for recording metadata for web caching in the cloud environment including steps of: (a) a first web server caching file information of a first web server container corresponding to itself in a first cache memory in the first web server container; (b) the first web server recording metadata of the first cache memory in a common file storage; and (c) the first web server, if the first web server is scaled out by adding a second web server, allowing the second web server to access the common file storage, to thereby allow the metadata to be recorded in a second cache memory in a second web server container corresponding to the second web server; and the first web server using the same.

BACKGROUND OF THE INVENTION

A web server means a server which receives a Hyper-Text Transfer Protocol (HTTP) request from a client, i.e., an entity requesting a worldwide web (referred to as the "web") service, and provides, to the client, a response to the HTTP request, i.e., content including a webpage, etc. In addition, a WAS means a software engine, which runs an application on the client through HTTP over a network, or hardware including it.

A web server may serve a static file such as an HTML page or image read from a disk. However, if there are a lot of disk accesses to the same file, the web server may cache it in the memory for repetitive use. In general, a time when the web server caches a file in the memory will be a time of the web server receiving a first request for the file and if the file is not changed, using the cached information is very efficient.

Meanwhile, in a cloud environment, an application and a web server, i.e., a web server software, are created as being included in one container. For example, an HTML file, etc. and the web server together may be inserted into the container as an image to use.

In such a cloud environment, when load on the web server increases or decreases, scaling-out or scaling-in process may be required.

Particularly, a time when the web server is scaled out by adding a new web server may be when the load on the web server exceeds predetermined threshold. Herein, the new web server may need to cache some files again if the new web server receives a first request for the files. However, if there are pre-cached data for the files in a cache memory of the new web server when the new web server receives the first request for the files, the new web server can access the data for the files very easily.

SUMMARY OF THE INVENTION

It is an object of the present invention to provide a method for effectively scaling out a first web server to thereby newly prepare a second web server by automatically performing web caching in a cache memory of the second web server at a time when the second web server is newly prepared.

In accordance with one aspect of the present invention, there is provided a method for recording metadata for web caching in a cloud environment, including steps of: (a) a first web server caching file information of a first web server container corresponding to itself in a first cache memory in the first web server container; (b) the first web server recording metadata of the first cache memory in a common file storage; and (c) the first web server, if the first web server is scaled out by adding a second web server, allowing the second web server to access the common file storage, to thereby allow the metadata to be recorded in a second cache memory in a second web server container corresponding to the second web server.

In accordance with another aspect of the present invention, there is provided a first web server for recording metadata for web caching in a cloud environment, including: a communication part; and a processor for performing processes of (i) caching file information of a first web server container corresponding to the first web server in a first cache memory in the first web server container; (ii) recording metadata of the first cache memory in a common file storage; and (iii) allowing, if the first web server is scaled out by adding a second web server, the second web server to access the common file storage, to thereby allow the metadata to be recorded in a second cache memory in a second web server container corresponding to the second web server.

BRIEF DESCRIPTION OF THE DRAWINGS

The drawings attached below to explain example embodiments of the present invention are only part of example embodiments of the present invention and other drawings may be obtained based on the drawings without inventive work for those skilled in the art.

DETAILED DESCRIPTION OF THE PREFERRED EMBODIMENTS

Figure 1:
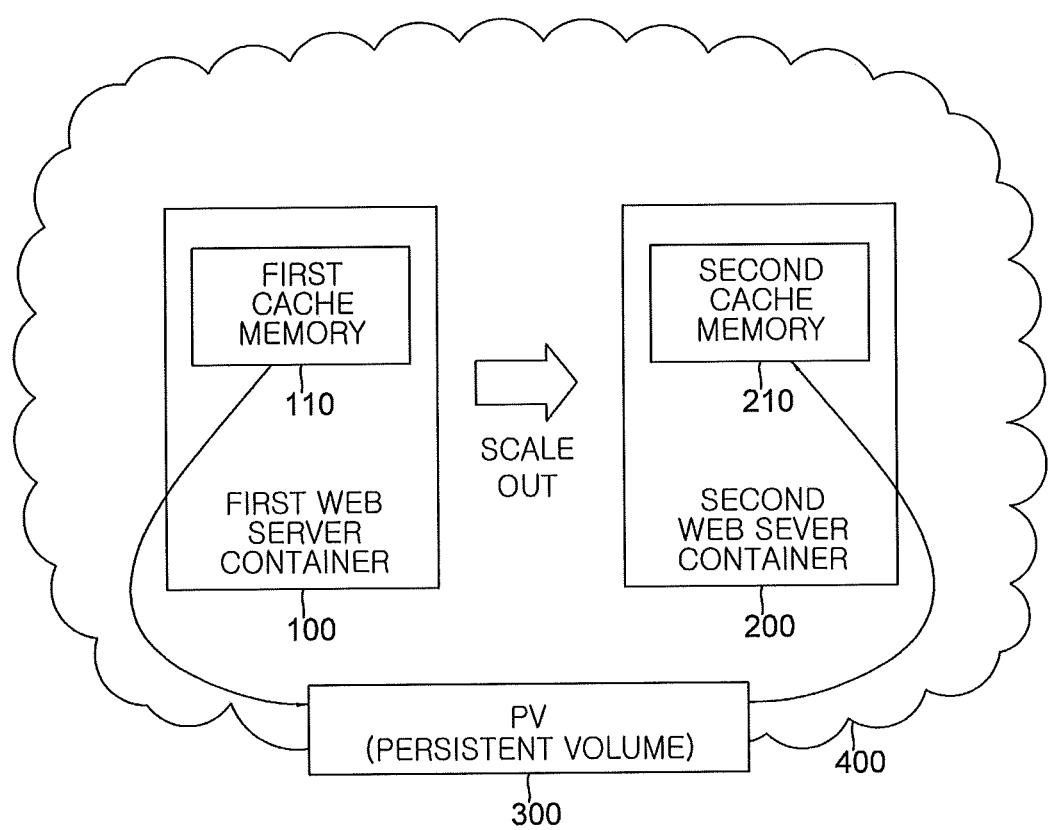
FIG. 1 illustrates a system, which includes a first web server container with a first cache memory, a second web server container with a second cache memory, and a persistent volume, for web-caching conveniently if it is scaled out in a cloud environment in accordance with the present invention.

Detailed explanations of the present invention explained below refer to attached drawings that illustrate specific embodiment examples of this present that may be executed. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To make it easy for those who have common knowledge in the art to which the present invention pertains to implement the present invention, detailed explanation on desirable embodiment examples of the present invention will be made by referring to attached drawings.

Figure 2:
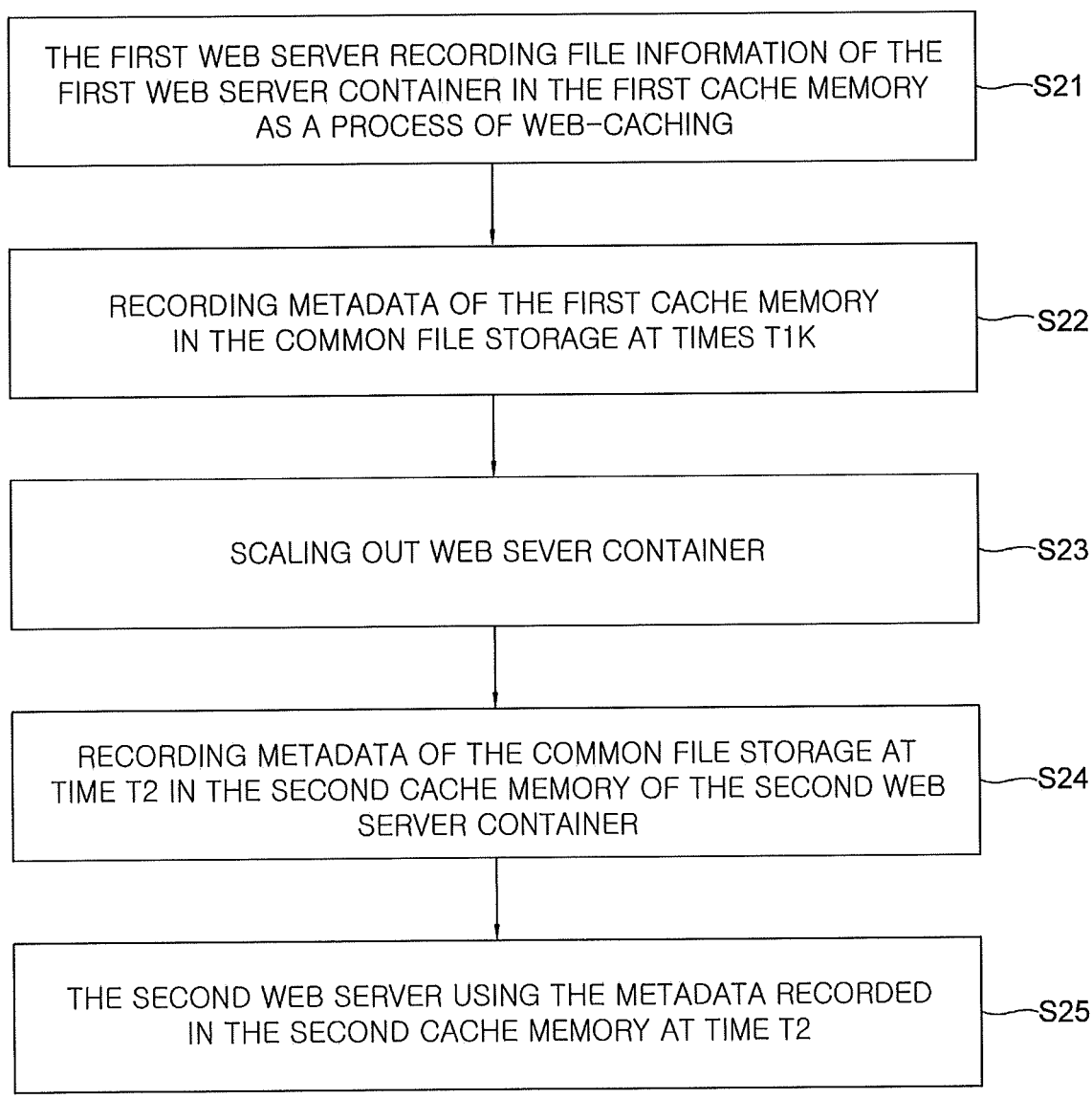
FIG. 2 is a flowchart showing a method for recording metadata for the web-caching in the cloud environment in accordance with the present invention.

FIG. 1 illustrates a system, which includes a first web server container with a first cache memory, a second web server container with a second cache memory, and a persistent volume, for web-caching conveniently if it is scaled out in a cloud environment in accordance with the present invention and FIG. 2 is a flowchart showing a method for recording metadata for the web-caching in the cloud environment in accordance with the present invention.

For reference, "web server" in the present invention may refer to web server software that provides web services, such as Apache HTTP server.

Further, "disk" mentioned in the present invention may refer to a virtual disk in a cloud environment.

Further, "communication part" mentioned in the present invention may allow software components, e.g., cache memories, web servers, web server containers, PV and the like, to communicate among each other in the cloud environment.

As explained above, in a cloud environment 400, a first application and a first web server are created as being included in one container 100 and a second application and a second web server are created as being included in one container 200. More specifically, HTML files, etc. to be served through the first application are inserted in the first web server container 100 as an image and HTML files, etc. to be served through the second application are inserted in the second web server container 200 as an image.

By referring to FIGS. 1 and 2, scaling-out process may be performed under a situation that there is load on the web server, e.g., the first web server, in cloud. A role of the web server is to read an application file including HTML file to run and serve it to a client. A base image of the web server container, i.e., the first web server container 100, is a container image that has information on the application file and the web server. The web server, i.e., the first web server, on service provides a cloud service with the container image. It intermittently records file information in the first cache memory 110 of the first web server container 100 as a process of web-caching at a step of S21. In detail, the first web server reads a file on a disk of the first web server container 100 and then transmits it to the first cache memory 110. For reference, if there are many services for the same file, the same file is cached in the first cache memory 110 and then used.

During the caching process, if a situation that load on the first web server exceeds a preset threshold occurs, a process of scaling-out is performed. That is, one or more web server containers, e.g., the second web server container 200, may be added. The one or more added web server containers are allowed to use the image of the existing web server container as it is. That is, because the base image of the first web server container 100 has merely the image of the container which only has the first application file and the first web server, the image of the second web server container 200 also has only a second application file and a second web server. For reference, it is made clear that this does not mean that the second application file and the second webserver are different from the first application and the first web server and they are merely indicated differently to distinguish what are included in the first web server container 100 and what are included in the second web server container 200. Meanwhile, the newly added second web server container 200 has a second memory cache in which no data has been cached.

In accordance with the present invention, the first web server records metadata as a key among items cached in the first cache memory 110 regularly or irregularly in a common file storage capable of allowing another web server, e.g., the second web server, to access and use. In one example embodiment of the present invention, the common file storage may be a persistent volume or PV. In general, when a web server is on service, a log file must be managed. However, when use of a web server container is stopped, all log files corresponding to the web server container may be lost. Accordingly, to store such log files permanently, NAS and NFS can be connected to the web server container. This example may be called as the PV.

By referring to FIGS. 1 and 2 again, the first web server records, in the common file storage 300, metadata as a key among items cached in the first cache memory 110 at times $t1k$, wherein the times $t1k$ represent one or more times at which the first web server records the metadata in the common file storage and the times $t1k$ include $t11, t12, \ldots t1n$ depending on changes in a value of k ($1<=k<=n$) at a step of S22. That is, when the caching is performed in the first web server container 100, the first web server records regularly or irregularly the metadata such as information on URL in the storage such as PV that can be commonly seen.

If the first web server container 100 is scaled out by adding the second web server container 200 in a cloud environment at a time t2 at a step of S23, the first web server corresponding to the first web server container 100 allows the second web server corresponding to the second web server container 200 to record the metadata in the second cache memory 210 of the second web server container 200 by allowing the second web server to access the common file storage 300 at a step of S24.

As explained above, because the second web server container 200 has only the second application file and the second web server at the time t2, there is no data cached in the second web cache memory 210 at the time t2. According to any conventional technologies, if the second web server receives a first request from a client, the second web server container 200 cannot use any cached data which is required to expedite the service to be provided to the client. In contrast, in accordance with the present invention, because the second cache memory 210 of the second web server container 200 has already brought the metadata from the common file storage 300 at the time t2, the second web server can use the metadata recorded in the second cache memory 210 at a step of S25. Therefore, although the first request is received from the client at the time t2, the second web server could provide the service to the client at the time t2 based on the metadata having been cached in the second cache memory 210 without having to perform a separate web-caching operation.

In accordance with the present invention, the first web server can be scaled out to thereby newly prepare the second web server efficiently by automatically performing web caching in the cache memory of the second web server at the time when the second web server is newly prepared.

The objects of the technical solution of the present invention or parts contributing to the prior art can be implemented in a form of executable program command through a variety of computer means and can be recorded to computer readable recording media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high-level code that can be used by an interpreter etc., which is executed by a computer. The aforementioned hardware devices can work as more than a software module to perform the action of the present invention and they can do the same in the opposite case. The hardware devices may be combined with memory such as ROM and RAM to store program commands and include a processor such as CPU or GPU composed to execute commands stored in the memory and also include a communication part for sending and receiving signals with external devices.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

What is claimed is:

1. A method for recording metadata for web caching in a cloud environment, comprising steps of:
    (a) a first web server caching file information of a first web server container corresponding to itself in a first cache memory in the first web server container;
    (b) the first web server recording metadata of the first cache memory in a common file storage; and
    (c) the first web server, if the first web server is scaled out by adding a second web server, allowing the second web server to access the common file storage, to thereby allow the metadata to be recorded in a second cache memory in a second web server container corresponding to the second web server,
    wherein, before the step of (c), when load on the first web server corresponding to the first web server container is detected to exceed a preset threshold, the first web server allows the second web server container to be created at a state without cached data in the second cache memory in the second web server container and then allows the step of (c) to be performed, and
    wherein, at the step of (c), the first web server allows the second web server to use the metadata recorded in the second cache memory of the second web server container as web-cached information.

2. The method of claim 1, wherein, at the step of (b), the first web server records, in the common file storage, the metadata as a key among items cached in the first cache memory at times $t1k$, where the times $t1k$ represent one or more times at which the first web server records the metadata in the common file storage and the times $t1k$ include $t11$, $t12$, $t1n$ depending on changes in a value of k ($1<=k<=n$); and
    wherein, at the step of (c), the first web server allows the second web server at a time $t2$, which is a time when the second web server is newly prepared in cloud, to access the common file storage, to thereby record the metadata at the time $t2$ in the second cache memory in the second web server container corresponding to the second web server.

3. The method of claim 1, wherein a first application and the first web server are included in the first web server container.

4. The method of claim 3, wherein HTML files to be served through the first application are included in the first web server container.

5. The method of claim 1, wherein the common file storage is a storage usable by the first web server and the second web server.

6. The method of claim 5, wherein the common file storage is a persistent volume (PV).

7. A first web server for recording metadata for web caching in a cloud environment, comprising:
    a communication part; and
    a processor for performing processes of (i) caching file information of a first web server container corresponding to the first web server in a first cache memory in the first web server container; (ii) recording metadata of the first cache memory in a common file storage; and (iii) allowing, if the first web server is scaled out by adding a second web server, the second web server to access the common file storage, to thereby allow the metadata to be recorded in a second cache memory in a second web server container corresponding to the second web server,
    wherein, before the process of (iii), when load on the first web server corresponding to the first web server container is detected to exceed a preset threshold, the processor allows the second web server container to be created at a state without cached data in the second cache memory in the second web server container and then allows the process of (iii) to be performed, and
    wherein, at the process of (iii), the processor allows the second web server to use the metadata recorded in the second cache memory of the second web server container as web-cached information.

8. The first web server of claim 7, wherein, at the process of (ii), the processor allows the metadata to be recorded in the common file storage as a key among items cached in the first cache memory at times $t1k$, where the times $t1k$ represent one or more times at which the first web server records the metadata in the common file storage and the times $t1k$ include $t11$, $t12$, $t1n$ depending on changes in a value of k ($1<=k<=n$); and
    wherein, at the process of (iii), the processor allows the second web server at a time $t2$, which is a time when the second web server is newly prepared in cloud, to access the common file storage, to thereby record the metadata at the time $t2$ in the second cache memory in the second web server container corresponding to the second web server.

9. The first web server of claim 7, wherein a first application and the first web server are included in the first web server container.

10. The first web server of claim 9, wherein HTML files to be served through the first application are included in the first web server container.

11. The first web server of claim 7, wherein the common file storage is a storage usable by the first web server and the second web server.

12. The first web server of claim 11, wherein the common file storage is a persistent volume (PV).

\* \* \* \* \*